United States Patent [19]

Holtkamp

[11] 3,891,957
[45] June 24, 1975

[54] REFERENCE CORRECTABLE TEMPERATURE CONTROL

[75] Inventor: Calvin J. Holtkamp, Mansfield, Ohio

[73] Assignee: White-Westinghouse Corporation, Cleveland, Ohio

[22] Filed: May 10, 1974

[21] Appl. No.: 468,708

[52] U.S. Cl. ............ 337/347; 337/57; 337/82; 337/94; 337/319
[51] Int. Cl. .............................. H01h 37/14
[58] Field of Search ......... 337/57, 82, 93, 94, 319, 337/347, 361, 368

[56] References Cited
UNITED STATES PATENTS

| | | | |
|---|---|---|---|
| 2,288,818 | 7/1942 | Marcy | 337/347 |
| 3,047,705 | 7/1962 | Manecke | 337/94 X |
| 3,239,633 | 3/1966 | Bletz | 337/347 |

Primary Examiner—J. D. Miller
Assistant Examiner—Fred E. Bell

[57] ABSTRACT

A control of the type having a bistable mechanism operated by a hydraulic oven temperature responsive device and a user adjusted shaft to effect opening and closing of a snap-acting cycling switch. The cycling switch is series connected in a circuit to directly control the energization of heating elements of a cooking oven in order to maintain the oven at a predetermined temperature. The predetermined temperature is referenced by a selector dial fitted on the shaft. An adjusting screw running concentrically of the adjusting shaft and accessible upon removal of the selector dial is included. The adjusting screw can be turned to alter the temperature at which the snap action switch cycles the heating elements with respect to the position of the selector dial.

6 Claims, 6 Drawing Figures

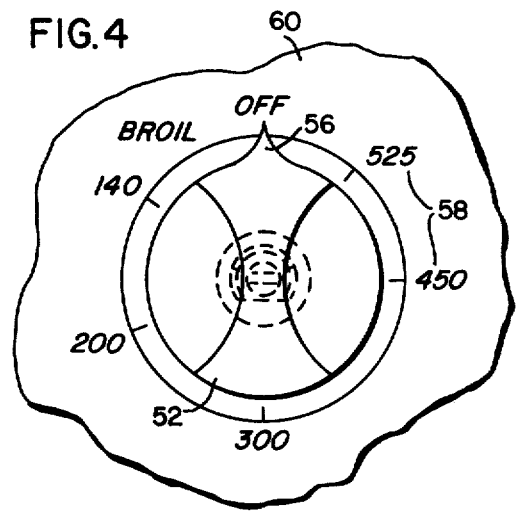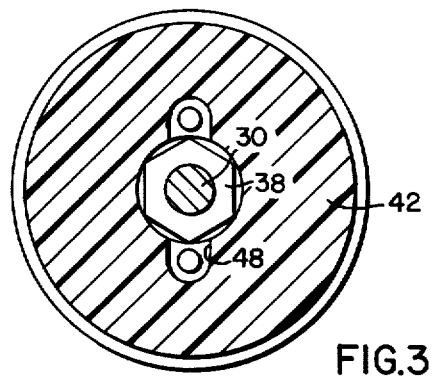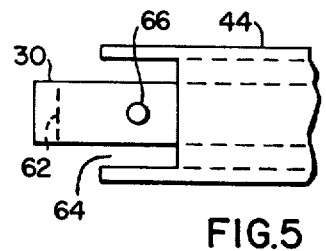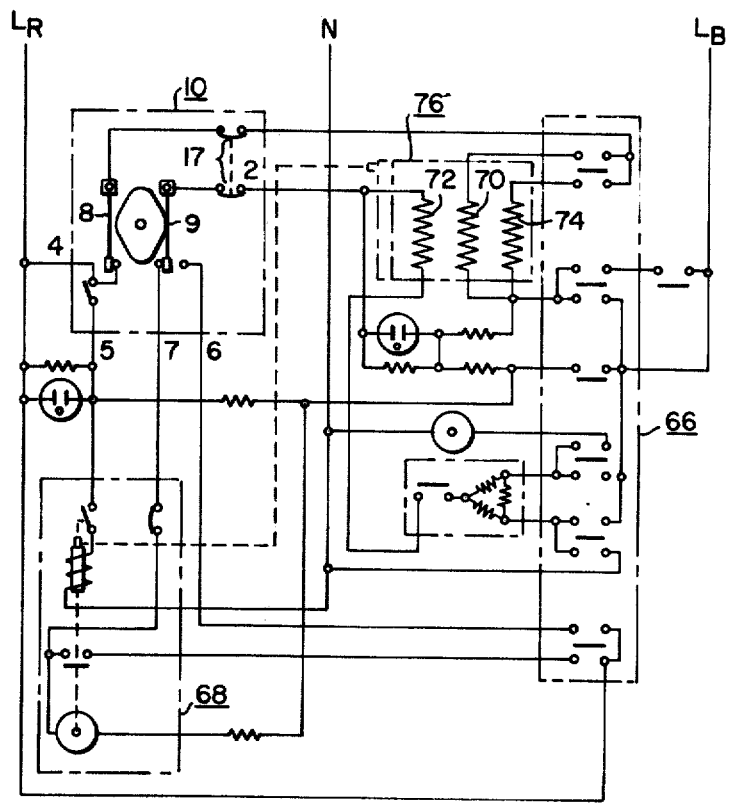

3,891,957

REFERENCE CORRECTABLE TEMPERATURE CONTROL

BACKGROUND OF THE INVENTION

1. Field of the Invention

This invention pertains to the art of thermostat controls and particularly to means for temperature calibration of cooking oven thermostat controls, for example.

2. Description of the Prior Art

Oven controls of the type which use a bistable mechanism subject to adjustment by the oven user are old in the art. Adjusting is usually accomplished by rotating a shaft connected to a selector dial. In this type of control, the adjustments are usually made to a snap-acting switch device operated by a hydraulic oven temperature responsive device. The snap-acting switch is connected in series with oven heating elements. However, the temperature at which the oven is maintained, by this system sometimes varies from the referenced temperature to which the selector dial has been set. One method for making the oven temperature and the referenced temperature agree has been to rotate a bushing of the control through which the adjustment shaft is threaded. This in effect rotates the adjustment shaft and the selector knob correcting the dial reading to the actual oven temperature. This method, however, because of the torque required to rotate the bushing, is somewhat susceptible to imprecise correction. The applicant is aware of no art considered pertinent to the present invention which provides structure which permits adjustment of the control to correct the oven temperature to the control indicated temperature. However, patents teaching various calibrating features or similar arrangements are U.S. Pat. Nos. 3,683,304; 2,179,281; 3,412,235; 3,680,021 and 2,980,386.

SUMMARY OF THE INVENTION

In accordance with the invention, there is provided a control of the type having a snap-acting overcenter mechanism for operating switch contacts in response to oven temperature sensing means and in which axial movement of a fulcrum member for setting the operating point of the snap-acting overcenter mechanism is achieved by operation of a user rotatable shaft arrangement. Rotation of the shaft arrangement positions the fulcrum member to effect an oven temperature corresponding to a predetermined reference temperature indicated by a selector dial attached to the rotatable shaft arrangement. The rotatable shaft arrangement includes an inner rod and an outer shaft means. The inner rod is accessible upon removal of the selector dial to be further rotated changing the operating point of the snap-acting mechanism with respect to the outer shaft means and selector dial position. This change corrects the oven temperature to the predetermined reference temperature.

BRIEF DESCRIPTION OF THE DRAWINGS

FIG. 3 is a fragmentary sectional view taken along line III—III of FIG. 2;

FIG. 4 is a face view with the selector dial assembled;

FIG. 5 is a fragmentary elevation view taken along the line V—V of FIG. 2; and

FIG. 6 is a schematic view of a circuit for an oven control system in which a control according to the invention may be used.

DESCRIPTION OF THE PREFERRED EMBODIMENT

Figure 1:
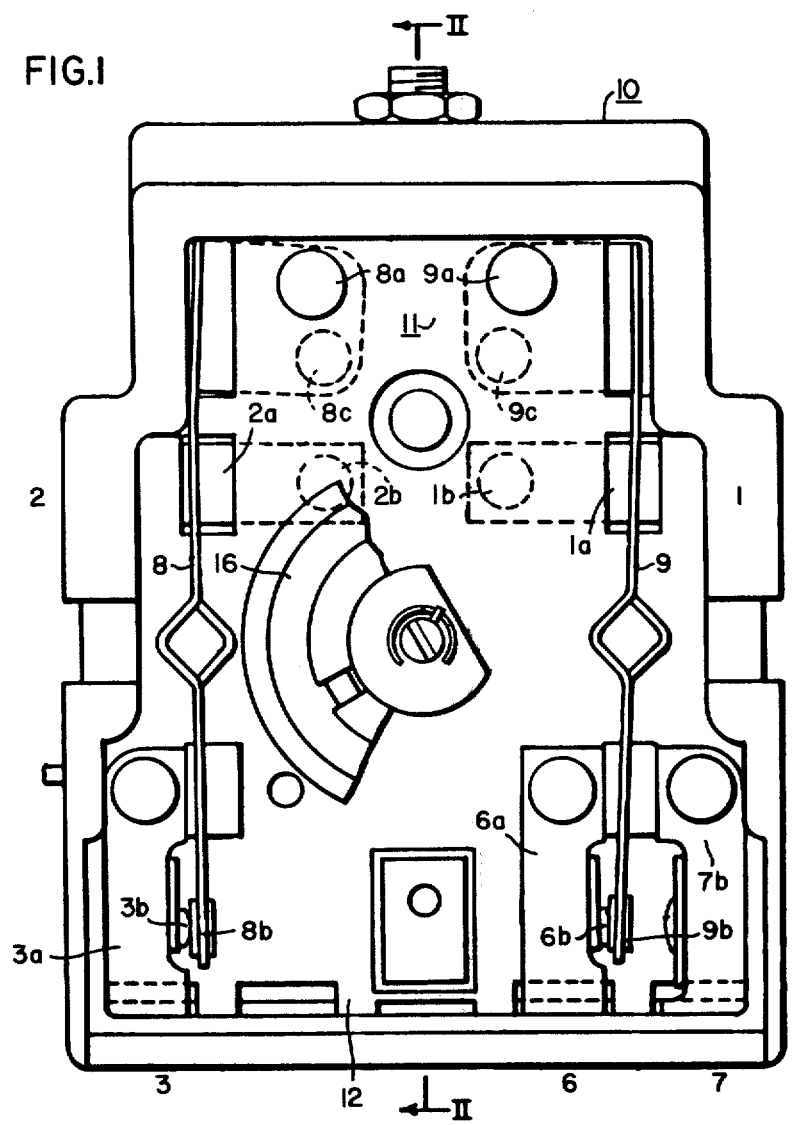
FIG. 1 is a partly broken face view of the thermostatic oven control with the cover omitted.
Figure 2:
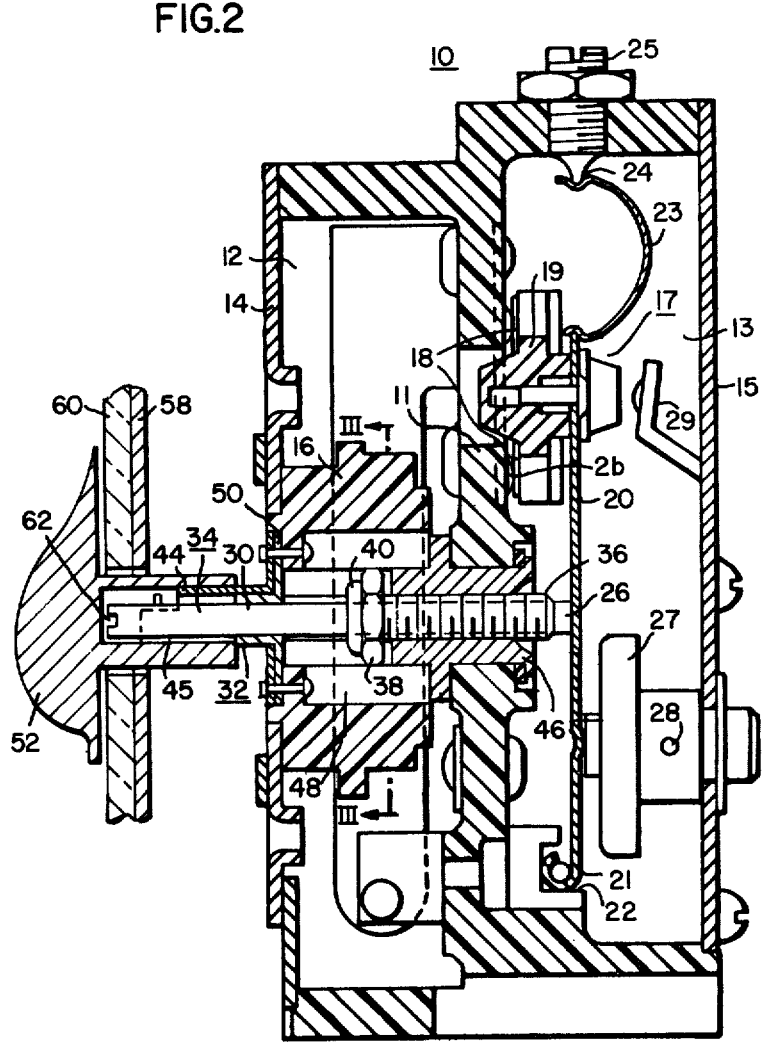
FIG. 2 is a vertical section taken along the line II—II of FIG. 1, but with the front cover in place and the selector dial shown.

The main parts of the oven control are shown in FIGS. 1 and 2. The casing 10 for the control is a molded plastic, generally box-shaped member with an intermediate wall 11 separating the interior into opposite, outwardly open front and rear chambers 12 and 13, respectively. The front chamber 12 and the rear chamber 13 are closed by removable covers 14 and 15. The front chamber basically contains circuit switching arms and contacts and the operable mechanism for setting the control. The rear chamber 13 essentially contains the bistable mechanism which operates the main switch for the oven heater and associated parts which control its operation.

While the contact terminals on the exterior of the oven control by which the control is connected into the circuits in which it functions are visible only from the rear of the control, the corresponding location of these terminals as viewed from the front, identified as 2–3 and 1–6–7, is shown in FIG. 1 to aid in relating the location of these contacts. The electrically conductive strips which terminate in the exterior terminals are riveted to the casing intermediate wall 11 and are given the same numeral as the exterior terminal with the suffix letter "a" to indicate the electrically common connection. The switch contact portions of each terminal and strip also carry the same numeral with the suffix "b."

Contact spring arms 8 and 9 are located in the front chamber 12. The spring arm 8 is anchored at its upper end and carries movable contact 8b at its lower end. The spring arm 9 is also anchored at its upper end and carries contact 9b at its lower end. Appropriate lobes on a cam generally designated 16 move the spring arms 8 and 9 in accordance with rotation of the cam 16 so that contact 8b is moved into or out of engagement with a contact 3b and a contact 9b is moved into or out of engagement with either of contacts 6b and 7b in accordance with the selected operation. The fixed upper ends of the spring arms 8 and 9 extend through slots in the intermediate wall 11 and have portions 8a and 9a extending along the rear base and riveted to the intermediate wall 11. Additional contacts 8c and 9c are provided on these riveted portions.

The main or cycling switch arrangement generally designated as 17 in FIG. 2 includes a pair of electrically conductive bridging strips 18 carried in spaced apart electrically insulated relationship by a plastic carrier 19 upon which they are secured in loosely held relation to accommodate proper seating upon the contacts which they bridge. When the cycling switch 17 is closed, the one strip 18 bridges from contact 2b, FIG. 2, to 8c the other strip 18 bridges from 1b to 9c. The carrier 19 is attached near one end of a spring arm 20. The spring arm 20 has a T-shaped end 21 which seats in a niche 22 formed in the casing material. The end of the arm 20 near to which the carrier 19 is attached, is received in an indent at one end of a curved overcenter spring 23 which has a dimple 24 at its opposite end. The dimple 24 seats on the point of an adjustment screw 25 turned into the side wall of the casing 10. The arm 20 is fulcrumed at an intermediate location against the end of a fulcrum member 26. A pressure wafer 27 is connected by a capillary tube 28 to an oven temperature sensitive bulb, not shown. The wafer 27 bears against the spring arm 20 at a location between the fulcrum member 26 location and the T-shaped end 21.

The cycling switch 17 functions as follows; with an increase in oven temperature, the pressure wafer 27 expands and exerts correspondingly increasing force on the arm 20 at the bearing location between the fulcrum member 26 and the end 21 in a forwardly direction with respect to the control. When the force provided by the pressure wafer exceeds the balancing force of the overcenter spring 23, the overcenter spring 23 snaps the cycling switch carrier 19. The carrier 19 is stopped by the inwardly projecting prongs 29 extending from the cover 15. Thus the main switch 17 which controls oven heaters designated as 70, 72 and 74 in FIG. 6 is open. If the temperature in the oven decreases below a given temperature, the pressure wafer 27 retracts with the slightly bowed spring arm 20 following so that at a given point the bowed spring arm 20 will cause the carrier 19 to snap back to close the contacts of the cycling switch 17. Thus, the snap-acting switch mechanism 17 is a bistable mechanism in that it remains in either of two positions until external forces derived from a temperature change in the oven causes it to change positions. It will be appreciated that by moving the fulcrum member 26 in an axial direction, the temperature setting at which the mechanism 17 will snap from one stable condition to the other stable condition may be selected.

The general arrangement of the cycling switch 17 with an overcenter snap action having its operation controlled by the relationship between a user operated positional means, such as fulcrum member 26, and pressure wafer 27 is commonly known in the art. This invention provides a known arrangement for adjusting the fulcrum member 26 from the exterior of the oven control to adjust the temperature at which the pressure wafer 27 will operate the snap-acting mechanism 17 to correspond to the temperature setting indicated by a dial 52 on the exterior of the control.

The fulcrum member 26 is the interior end of an inner rod 30 which is a part of a rotatable shaft assembly 32. The rotatable shaft assembly 32 is comprised of, in addition to the inner rod 30, an outer shaft means 34. The outer shaft means 34 includes an adjustment screw 36 having a hexagonal head 38, a frictional lock nut 40, a selector cam 16, and a hollow outer shaft 44 fixed to the cam.

The adjustment screw 36 passes threadably through a bushing 46 which is riveted in the intermediate wall 11. The inner rod 30 passes threadably through the center of the adjustment screw 36 and is held fast with respect to the adjustment screw 36 by the lock nut 40 which frictionally engages the hexagonal head 38 of the adjusting screw 36. The cam 16 includes an interior hole 48 dimensioned to allow the cam to grip the hexagonal head 38, as shown in FIG. 3. The inner rod 30 passes concentrically through the hollow outer shaft 44 in a clearance relationship and the hollow outer shaft 44 is fixed to cam baseplate 50 secured to the exterior face of the cam 16. This enables the outer shaft 44 and the cam 16 to be rotated as a unit.

Rotation is imparted to the outer shaft 44 by rotating a selector dial 52. The outer shaft 44 has an arcuate section 45 removed along its length giving outer shaft 44 when viewed in cross section a D shape which is complementary to the shape of a bore hole 54 in the shaft of the selector dial 52. The selector dial 52 is shown in FIG. 4. The user rotates selector dial 52 setting pointer 56 to reference the particular oven temperature displayed by indicia 58.

The rotation of the dial 52 is transferred to the outer shaft 44 and in turn to the cam 16. The cam 16 operates the appropriate selector switch and also transfers the rotation to the hexagonal head 38 of the adjustment screw 36. The adjustment screw 36 rotates with respect to the bushing 46 moving the fulcrum member 36 in an axial direction. As explained above, the position of the fulcrum member 26 determines the point at which spring arm 20 will open the cycling switch 17 which in turn establishes oven cavity temperatures.

If when measured by a separate instrument, such as a thermometer, the oven cavity temperature is not equal to the temperature referenced by the selector dial 52, then correction of the oven cavity temperature to correspond to the selector dial referenced temperature can be achieved in the following manner. With the dial 52, removed from the outer hollow shaft 44, the inner rod 30 is accessible to be adjusted from without the control, that is, from the exterior of the panel, which may be a viewing glass 60, FIG. 2. By inserting an appropriate tool, such as an edge of a table knife or screwdriver, into a slot 62 in the end of the inner rod 30, the inner rod 30 may be rotated relative to the outer shaft means 34, which is held against rotation. Lock nut 40 is a friction type which provides sufficient locking force to prevent normal use and vibrations from moving inner rod 30 with respect to the outer shaft means 34, but the locking force provided is not sufficient to prevent the correction as thus described. By moving the inner rod 30, the fulcrum member 26 is moved axially with respect to the outer shaft means 34 so that at a given setting of the dial 52 and the outer shaft 34, the operating point of cycling switch 17 has been changed from the point at which it would have operated to a point which corresponds more closely to the temperature at which the dial 52 is set.

In the preferred embodiment as shown in FIG. 2, the adjustment screw 36 is positioned with respect to the bushing 46 at the factory, coordinating the referenced temperature, indicated by the dial 52, with oven cavity temperature. Therefore, the reference correctable adjustment of the inner rod 30 with respect to the outer shaft means 34 is intended for relatively small corrections of oven cavity temperature with respect to dial indicated temperature. Because of this, in the preferred embodiment, the amount of correction is limited to about 40°F. This is accomplished by limiting the amount the inner rod 30 can be rotated with respect to the outer shaft means 34.

The currently preferred way of doing this is as shown in FIG. 5. An arcuate section 64 is removed from the end of the outer hollow shaft 44. A pin stop 66 attached to the inner rod 30 protrudes radially from the inner rod 30 through the removed section 64 so that as the inner rod 30 is rotated, the pin stop 66 contacts the sides of the removed section 64 limiting further rotation of the inner rod 30 with respect to the outer shaft means 34. The size of the removed section 64 is coordinated with the pitch of the thread between the inner rod 30 and the adjustment screw 36 in order to achieve the approximately 40°F temperature range of adjustment provided by turning the inner rod 30.

Referring now to FIG. 6, an electrical circuit arrangement including the oven control in an oven control system for a self-cleaning cooking range is shown. The invention however, is equally adaptable to an oven not having the self-cleaning feature, as well as other appliances requiring controlled heating such as clothes dryers. The major components of the system, in addition to the oven control 10 includes the selector switch 66, a lock assembly 68 for the purpose of insuring that a cleaning operation cannot occur without the oven door being locked during the high temperature operation. The other major components are bake heating element 70, broil heating element 72, and the auxiliary broil heating element 74. All of the heating elements, of course, are located within the oven 76 which is schematically illustrated. All of the oven heating elements are connected in series circuit relationship with the snap-acting switch 17.

For a detailed description of the operation of the circuit shown in FIG. 6, reference may be made to U.S. Pat. No. 3,648,012.

From the foregoing description, taken with the showing of the drawings, it is seen that this invention has provided a novel and useful arrangement for calibrating an oven control to make the oven cavity temperature correspond to the temperature setting of a control dial positioned exterior of the oven cavity.

What I claim is:

1. In a control of the type having a casing with a snap-acting, overcenter mechanism therein for operating cycling switch contact means, and in which positioning of a fulcrum controls the operating point of said overcenter mechanism;
    a rotatable hollow outer shaft, having an inner end and a headed outer end, threadably carried in said casing and axially movable in accordance with rotation of the outer shaft;
    a rotatable rod threadably carried in said outer shaft and having an inner end projecting beyond said inner end of said outer shaft to serve as said fulcrum of said overcenter mechanism, said rod extending outwardly well beyond said headed outer end of said outer shaft;
    circuit switching cam means including a recess receiving said headed outer end of said outer shaft in rotationally coupled relation, said cam means also including an outwardly projecting sleeve through which said rod extends and projects beyond the outer end of said sleeve;
    a removable, user operated rotatable temperature setting dial in indexed relation on said sleeve and covering the outer ends of said sleeve and said rod; and
    means on the outer end of said rod for engagement by a tool with said dial removed for rotating said rod to shift said rod axially relative to said outer shaft and to thereby recalibrate said control by changing said fulcrum position relative to the rotative position of said dial and sleeve.

2. In a control according to claim 1 including:
    means limiting rotation of said rod relative to said outer shaft to a predetermined angular valve.

3. In a control according to claim 2 wherein:
    said limiting means includes a notched portion of said sleeve, and a radial projection on said rod located to engage one or the other edges of said notch at the limits of rotation of said rod.

4. In a control according to claim 1 wherein:
    said tool engagement means comprises a slot in the outer end of said rod.

5. In a control according to claim 1 including:
    lock nut means threadably carried on said rod and engaging said headed outer end of said outer shaft to hold said rod and shaft for rotation together in normal use of said control, while permitting rotation of said rod relative to said outer shaft for calibration purposes.

6. In an oven control in which power for oven heating is directly interrupted by said control through opening of snap-acting switch contact means upon the imposition of a force proportional to oven temperature upon an arm carrying said switch contact meand and having means for adjusting the opening temperature of said contact means to a referenced temperature through fulcrum means bearing upon said arm, wherein the improvement comprises means for correcting said opening temperature of said contact means to said referenced temperature including:
    an inner rod having an interior end serving as said fulcrum for bearing on said arm;
    a rotatable shaft arrangement including a temperature selector dial a hollow sleeve portion connected with said dial and substantially surrounding said inner rod, a selector cam fixed to said hollow sleeve portion, and an outer shaft means rotatably driven by said cam and threadably carried in said control, said outer shaft means threadably carrying said inner rod;
    said inner rod and said rotatable shaft arrangement being rotatable as a unit for selecting said opening temperature;
    said inner rod being accessible upon removal of said selector dial to be rotated and thereby moved axially with respect to said rotatable shaft arrangement.

* * * * *

UNITED STATES PATENT OFFICE
CERTIFICATE OF CORRECTION

PATENT NO. : 3,891,957
DATED : June 24, 1975
INVENTOR(S) : Calvin J. Holtkamp

It is certified that error appears in the above-identified patent and that said Letters Patent are hereby corrected as shown below:

Under the caption "Description of the Preferred Embodiment", Column 4, Line 15, change "36" to -- 26 -- .

Under the caption "What I Claim Is", Column 6, Claim 2, Line 11, change "valve" to -- value --

Signed and Sealed this thirtieth Day of September 1975

[SEAL]

Attest:

RUTH C. MASON
Attesting Officer

C. MARSHALL DANN
Commissioner of Patents and Trademarks